Sept. 30, 1952 J. L. DAVIS 2,612,136
MILKING MACHINE TEAT CUP ASSEMBLY
Filed June 5, 1950 2 SHEETS—SHEET 1
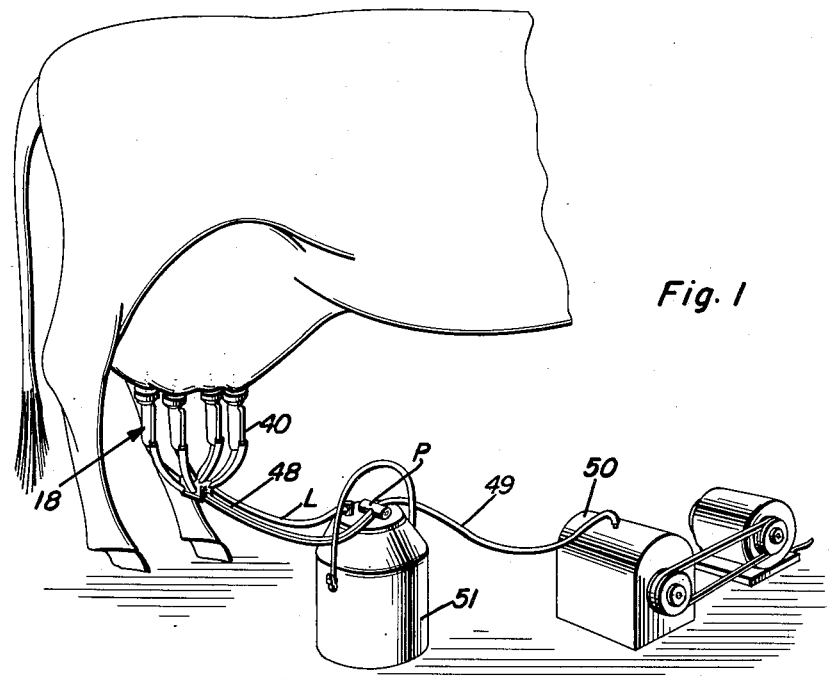
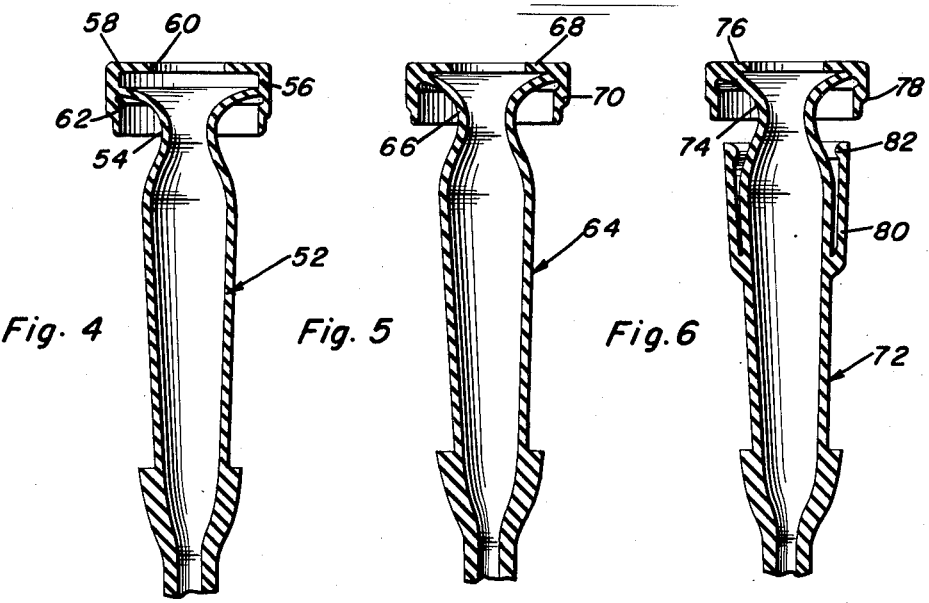
James L. Davis
INVENTOR.

Sept. 30, 1952 J. L. DAVIS 2,612,136
MILKING MACHINE TEAT CUP ASSEMBLY
Filed June 5, 1950 2 SHEETS—SHEET 2

James L. Davis
INVENTOR.

BY Clarence A. O'Brien
and Harvey B. Jacobson
Attorneys

Patented Sept. 30, 1952

2,612,136

UNITED STATES PATENT OFFICE 2,612,136

MILKING MACHINE TEAT CUP ASSEMBLY

James L. Davis, Le Roy, Minn.

Application June 5, 1950, Serial No. 166,135

2 Claims. (Cl. 119—14.52)

This invention relates to new and useful improvements in milking machines and more particularly to a teat cup assembly for milking machines.

The primary object of the present invention is to provide a teat cup for use with milking machines and so constructed as to permit the same to function in the identical steps as hand milking to prevent milk from being forced back into the udder.

Another object of the present invention is to provide a teat cup for milking machines that is quickly and readily applied to or removed from a teat and which embodies a resilient, contractible and expandable tube that is selectively expanded and contracted to effect a dispensing of milk from the teat of a cow in a manner comfortable to the cow.

Yet another object of the invention is to provide a teat cup including a resilient squeezing member that is expanded by an air evacuator and which is self-contracting to eliminate the necessity of having to employ large, bulky and costly equipment for contracting the squeezing member.

A further object of the present invention is to provide a teat cup for milking machines that is extremely small and compact in structure and which includes parts that are quickly and readily assembled or disassembled to permit the same to be cleaned and retained in a sanitary condition.

A still further aim of the present invention is to provide a teat cup of the aforementioned character that is simple and practical in construction, strong and reliable in use, efficient and durable in operation, relatively inexpensive to manufacture, and otherwise well adapted for the purposes for which the same is intended.

Yet another object of the present invention is the provision of a teat cup that will operate on a reduced or lower vacuum, to prevent irritation of the teats, making it more soothing to a cow. By reducing the irritation on the end of the teat, this will in turn help to reduce the chances of contracting mastitis.

Other objects and advantages reside in the details of construction and operation as more fully hereinafter described and claimed, reference being had to the accompanying drawings forming part hereof, wherein like numerals refer to like parts throughout, and in which:

Figure 1 is a diagrammatic view showing the present invention in use and applied to a vacuum pump;

Figure 4 is a longitudinal vertical sectional view showing on a reduced scale of the inner tubular member in slightly modified form, the outer tubular member being removed therefrom;

Figure 5 is a longitudinal vertical sectional view of the inner tubular member in further modified form, the outer tubular member being removed therefrom;

Figure 6 is a longitudinal vertical sectional view of the inner tubular member in still further modified form, the outer tubular member being removed therefrom; and, Figure 7 is a perspective view of the inner tubular member illustrated in Figure 4.

Figure 2:
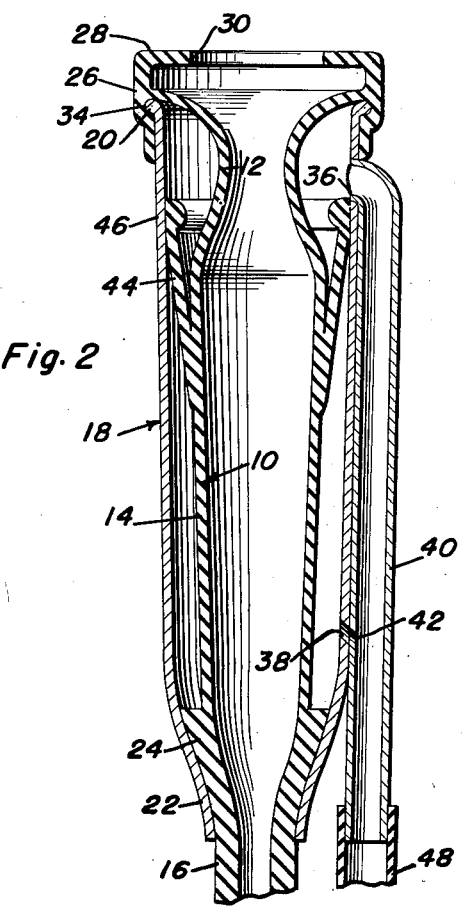
Figure 2 is a longitudinal vertical sectional view of one embodiment of the present invention, showing the inner tubular member contracted.
Figure 3:
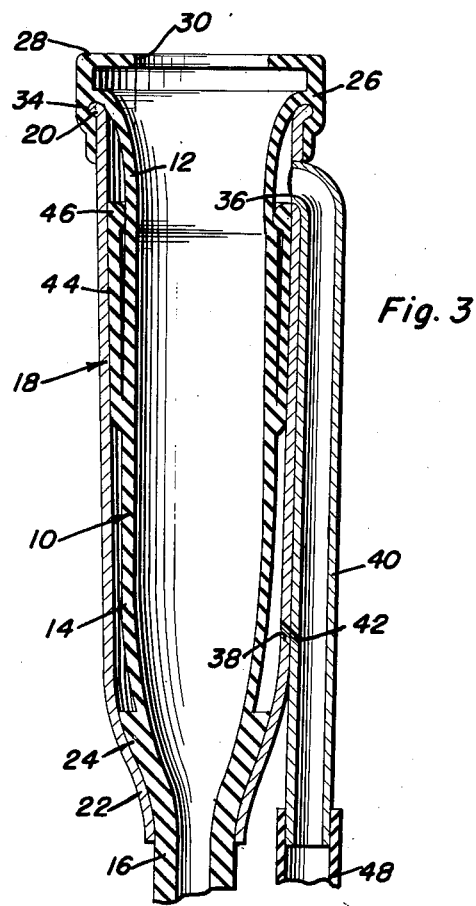
Figure 3 is a view similar to Figure 2 but showing the inner tubular member expanded.
Figure 7:
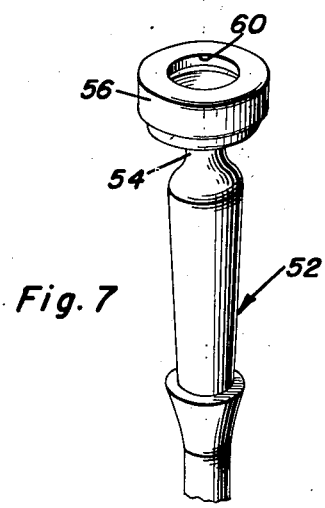

Referring now to the drawings in detail, and more particularly to Figures 2 and 3, wherein for the purpose of illustration, there is disclosed one embodiment of the present invention, the numeral 10 represents an elongated, resilient, preferably live rubber with plenty of elasticity to stand continuous stretching, inner tubular member having an upper reduced portion or neck 12 and a lower portion 14 that tapers inwardly and downwardly to form an outlet 16.

An elongated outer tubular member 18, of preferably metallic or plastic material, embraces the inner tubular member 10. The upper end of the outer tubular member 18 is provided with a beading 20 that bears against the outer periphery of the reduced upper portion 12 and the lower inwardly and downwardly tapered end 22 of the outer tubular member 18 is fitted about a continuous shoulder or enlargement 24 on the outlet 16.

The upper edge of the inner tubular member 10 is integrally formed with the flanged portion 26 of a cap 28, and the cap 28 is centrally apertured, as at 30, to accommodate a teat that will extend into the lower portion 14 of the inner tubular member 10. The flanged portion 26 of the cap 28 is provided with an internal groove 34 that receives the beading 20 of the outer tubular member 18 and the flanged portion 26 yieldingly embraces the upper end of the outer tubular member so that there will be provided an air space between the inner and outer tubular members.

Adjacent the upper end of the outer tubular member 18 there is provided an upper opening 36. A lower opening 38 is also provided in the outer tubular member 18 adjacent the lower end 22 thereof. The upper end of a conduit 40 is fixed to the outer tubular member 18 about or within the upper opening 36 and the conduit 40 is formed with an aperture 42 that registers with the lower opening 38. The opening 36 is of an area greater than the area of the opening 38 for a purpose which will presently be described.

Integrally formed with the outer periphery of the inner tubular member 10 is an air space divider or skirt 44 having a reinforced upper edge 46 that yieldingly bears against the inner periphery of the tubular member 18 below the opening 36.

In practical use of the present invention illustrated in Figures 2 and 3, the conduits 40 are connected to conduits 48 that branch from a further conduit 49 that extends to a motor operated air evacuator or vacuum pump 50 and which is connected to a pulsator P so that the inner tubular member 10 can be expanded to comfortably receive a teat. The outlets 16 are connected to a supply line L that extends to a pail 51 supporting the pulsator. When the vacuum in the conduits 40 is released, the reduced portion 12 will contract prior to the contraction of the portion 14 (corresponding to the closing of the index finger in hand milking). Then, the portion 14 will contract, beginning at its upper part due to the placement of the opening 38 (corresponding to the closing of other fingers, other than the index finger, during hand milking). After the rubber in the teat cup has reduced or contracted to its normal shape, the vacuum pulling on inflation through conduit L from pail, connected at 16, will tend to pull the rubber inflation together in a still smaller space by flattening it as in any ordinary teat cup completing the action as one would close his finger. By such an operation, with the reduced portion 12 contracting first, milk cannot be forced back into the udder.

Reference is now directed to Figure 4, wherein there is disclosed the inner tubular member 52 in slightly modified form. In this embodiment, the upper edge of the reduced or concavo-convexed upper portion 54 of the inner tubular member is integrally formed with the depending flanged portion 56 of a cap 58. The cap 58 is formed with a central teat receiving opening 60 and the flanged portion 56 is provided with an internal groove 62 for receiving the beading of an outer tubular member of shell similar to the aforedescribed element 18.

The inner tubular member 52 is identical to the member 10 except that the member 52 does not include a skirt 44, however, the function and operation of the member 52 is similar in all respects to the member 10.

As shown in Figure 5, the inner tubular member 64 is provided with a reduced upper portion 66 whose upper edge is integrally formed with a centrally apertured cap 68 at the juncture of the cap with its flanged portion 70 so that the reduced portion 66 will be as close as possible to the udder thereby facilitating the member 64 to be utilized with short thick teats.

The teat cup shown in Figure 6 is also employed with relatively short thick teats and comprises an elongated resilient inner tubular member 72 whose upper reduced portion 74 is integrally formed with a centrally apertured cap 76 at the juncture of the cap 76 with its depending flanged portion 78 to permit the portion 74 to be disposed as close as possible to the udder.

The outer periphery of the member 72 is integrally formed with a skirt 80 having a reinforced upper edge 82 that will yieldingly bear against the inner periphery of an outer tubular member similar to member 18.

The inner tubular members 64 and 72, like the inner tubular member 52, are constructed for use with the outer tubular member 18, previously described.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a milking machine teat cup assembly, a teat cup comprising an elongated, resilient inner tubular member having upper and lower portions, an outer tubular member embracing the inner member and having a portion spaced laterally from and disposed about the upper and lower portions of said inner member to define an air space, a depending peripheral flange at the upper portion of said inner member yieldingly embracing the upper end of said outer member, the upper portion of said inner member being reduced in cross-section below said flange, said outer member having upper and lower openings therein, a conduit disposed exteriorly of said outer member and having an upper end surrounding the upper opening, said conduit having an aperture in registry with the lower opening, a skirt having a lower end integrally formed with the outer periphery of said inner member intermediate the upper and lower portions thereof, said skirt being disposed within the outer member and having an upper end engaging the inner periphery of said outer member below said upper opening and well above said lower opening, and means attached to the lower end of the conduit for evacuating air between said inner and outer members through said upper and lower openings to expand the upper and lower portions of said inner member, said upper opening being of an area greater than the area of the lower opening for expansion and contraction of the upper portion of said inner member prior to the expansion and contraction of the lower portion of said inner member.

2. In a teat cup assembly, a teat cup comprising an inner tubular member having upper and lower open end portions, a rigid outer tubular member embracing the inner member, the ends of said outer member being engaged with the ends of the inner member and said outer member being spaced radially outwardly from the inner member to provide an air space, said outer member having upper and lower openings communicating with the air space, a resilient substantially inverted frusto-conical skirt having a lower minor end integrally formed with said inner member intermediate the upper and lower ends thereof, said skirt having an upper major end yieldingly engaging the inner periphery of said outer member below said upper opening and considerably above said lower opening, and means operatively connected with the openings for withdrawing air from the space between said inner and outer members.

JAMES L. DAVIS.

REFERENCES CITED

The following references are of record in the file of this patent:

UNITED STATES PATENTS

| Number | Name | Date |
|---|---|---|
| 884,781 | Uebler | Apr. 14, 1908 |
| 981,730 | Wiggins | Jan. 17, 1911 |
| 1,089,838 | Hulbert | Mar. 10, 1914 |
| 1,106,846 | Rieske | Aug. 11, 1914 |
| 1,111,978 | Uebler | Sept. 29, 1914 |
| 1,361,435 | Armes | Dec. 7, 1920 |
| 1,601,145 | Remy | Sept. 28, 1926 |
| 1,839,765 | Knox | Jan. 5, 1932 |
| 2,079,435 | Dinesen | May 4, 1937 |

FOREIGN PATENTS

| Number | Country | Date |
|---|---|---|
| 285,233 | Great Britain | Feb. 16, 1928 |
| 59,072 | Denmark | Sept. 29, 1941 |